United States Patent [19]

Tsubaki

[11] 4,183,994
[45] Jan. 15, 1980

[54] HEAT INSULATING PLATE

[75] Inventor: Yosuke Tsubaki, Toyota, Japan

[73] Assignee: Toyota Jidosha Kogyo Kabushiki Kaisha, Toyota, Japan

[21] Appl. No.: 882,195

[22] Filed: Feb. 28, 1978

[30] Foreign Application Priority Data

Jul. 25, 1977 [JP] Japan .................................. 52-89682

[51] Int. Cl.² .............................................. B32B 15/00
[52] U.S. Cl. .................................... 428/253; 428/256; 428/443; 428/444
[58] Field of Search ............... 428/253, 255, 256, 271, 428/443, 444, 257, 258, 259, 99, 100, 126, 129, 102; 123/195 C, 198 E

[56] References Cited

U.S. PATENT DOCUMENTS

| 2,057,071 | 10/1936 | Stranahan | 428/444 |
|---|---|---|---|
| 2,073,334 | 3/1937 | Coffman | 428/444 |
| 2,728,700 | 12/1955 | Gatke | 428/256 |
| 3,850,789 | 11/1974 | Kingsbury | 428/444 |
| 4,048,366 | 9/1977 | Kingsbury | 428/444 |

Primary Examiner—James J. Bell
Attorney, Agent, or Firm—Koda and Androlia

[57] ABSTRACT

A heat insulating plate for use in a motor vehicle engine comprising a heat resisting metal plate adapted to be secured to an outer surface of the motor vehicle engine in slightly spaced apart relation with the outer surface of the motor vehicle engine at a portion heavily affected by heat from the motor vehicle engine and a vibration absorbing member comprising asbestos integrally joined to said heat resisting metal plate.

22 Claims, 8 Drawing Figures

HEAT INSULATING PLATE

BACKGROUND OF THE INVENTION

1. Field of Invention:

This invention relates to heat insulating plates and more particularly to heat insulating plates used in motor vehicles which not only provide heat insulation but also absorb vibration.

2. Prior Art:

In general heat insulating plates are disclosed around an exhaust manifold, hot air intake manifold and the like which constitute the main heat sources in a motor vehicle engine, etc., thereby reducing the damage caused by such heat sources to parts located there around.

However, it has been common practice to utilize materials having a low damping capacity such as steel as the heat insulating plate and the heat insulating plates are secured to the heat source in slightly spaced apart relationship with the outer surface of the heat source. Consequently, there has been presented a disadvantage that, with a heat source subjected to intense vibrations such as a motor vehicle engine, the heat insulating plate itself vibrates to create a new noise source and cause high resounding noise. This disadvantage is particularly noteable with a heat insulating plate of cantilever type construction which is secured to the main body of the engine as a heat insulating plate used for heat insulating of an exhaust manifold of a motor vehicle engine.

On the other hand, in order to reduce vibrations of the heat insulating plate caused by vibrations of an engine, some solutions have been suggested which include changing the weight of the heat insulating plate, adding a weight to the heat insulating plate and changing the resonant frequency of the heat insulating plate. Particularly, with a motor vehicle engine wherein the vibrational frequencies vary to a considerable extent depending upon the running conditions, it is difficult to set the resonant frequency of the heat insulating plate so as to be out of all of the vibrational frequency bands generated by the engine.

Furthermore, it has been suggested that one should utilize a vibration absorbing material such as asbestos to make a heat insulating plate as a whole instead of using a metal plate as the heat insulating plate. However, there has been a problem in that if asbestos is used as the portion heavily affected by heat from the heat source the asbestos is broken down into pieces due to the heat and therefore ceases to function as the heat insulating plate.

SUMMARY OF THE INVENTION

Accordingly it is the general object of the present invention to provide a heat insulating plate which not only provides heat insulation but also absorbs vibration.

It is another object of the present invention to provide a heat insulating plate which can be utilized with the engines of motor vehicles.

In keeping with the principles of the present invention, the objects are accomplished by a unique heat insulating plate for use in motor vehicles comprising a heat resisting metal plate adapted to be secured to the outer surface of the motor vehicle engine in slightly spaced apart relation with the outer surface of the motor vehicle engine at a portion heavily affected by heat from the motor vehicle engine and a vibration absorbing member comprising asbestos integrally joined to said heat resisting metal plate and disposed at a portion of the motor vehicle engine which is lightly affected by heat from the motor vehicle engine.

BRIEF DESCRIPTION OF THE DRAWINGS

The above mentioned features and objects of the present invention will become more apparent by reference to the following description taken in conjunction with the accompanying drawings, wherein like referenced numerals denote like elements, and in which.

DETAILED DESCRIPTION OF THE INVENTION

Figure 1:
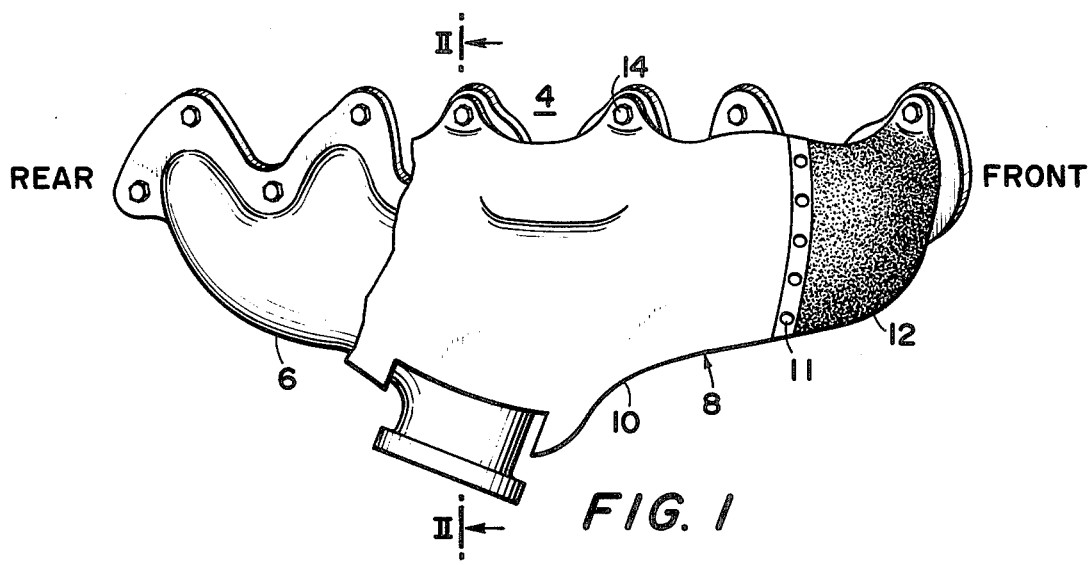
FIG. 1 is an oblique view illustrating the position where a heat insulating plate in accordance with the teachings of the present invention is provided on an exhaust manifold of a motor vehicle engine.
Figure 2:
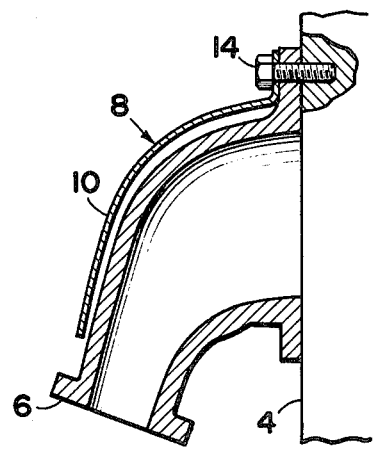
FIG. 2 is a cross-sectional view taken along the line II—II in FIG. 1.

Referring more particularly to the drawings, shown in FIGS. 1 and 2 is a heat insulating plate 8. In FIGS. 1 and 2, the heat insulating plate 8 is disposed around an exhaust manifold 6 of a six cylinder automotive engine. As shown in FIG. 1, the heat insulating plate comprises a steel plate 10 covering the upper surface of the portion of the second through sixth cylinders which are the most affected by the heat generated by the exhaust manifold 6. The plate 8 further includes a vibration absorbing member 12 essentially made of asbestos which is integrally joined to the steel plate 10 at a joint 11 and which covers the upper surface portion of the first cylinder located at the front of the engine and which is affected lightly by heat. The heat insulating plate together with the exhaust manifold are secured to the main body of the engine 4 by bolts 14.

Figure 3:
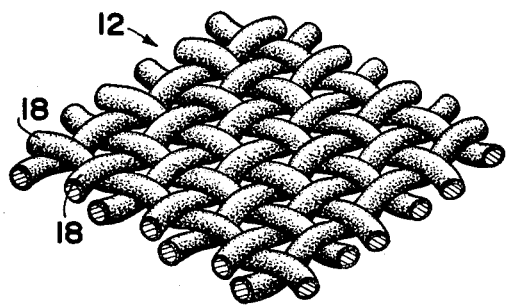
FIGS. 3 and 4 are oblique views illustrating the arrangement of the vibration absorbing material in the embodiment of FIG. 1.
Figure 4:
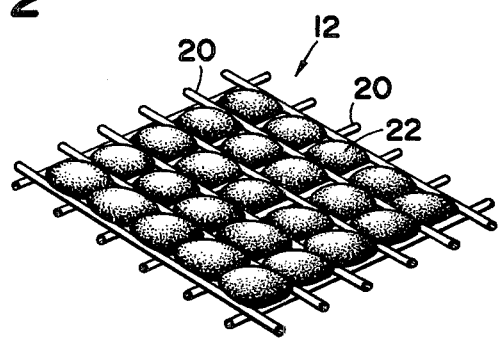

As shown in FIGS. 3 and 4, the vibration absorbing member 12 may be one which is knit from asbestos coated metallic wire 18 in somewhat the same form as cloth or may be made of a wire knit 20 with asbestos 22 provided in the mesh of the wire net 20. Furthermore, the vibration absorbing member 12 could also be formed from plain asbestos.

Out of the above described methods of making the vibration absorbing member, the one made by knitting asbestos coated metallic wire in a form somewhat like cloth can be relatively easily manufactured and has high durability against heat and vibration. Additionally, the one which is made by inserting asbestos into the mesh of a wire screen also has high durability against heat and vibration. Furthermore, the one formed by asbestos only can be relatively easily manufactured.

Figure 5:
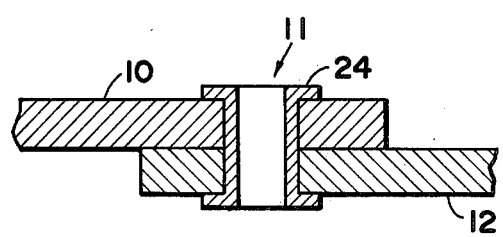
FIGS. 5 through 7 are cross-sectional views illustrating various methods for joining the steel heat resisting plates to the vibration absorbing member in the embodiment of FIG. 1.
Figure 6:
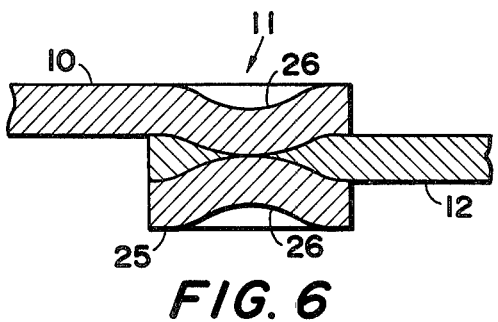
Figure 7:
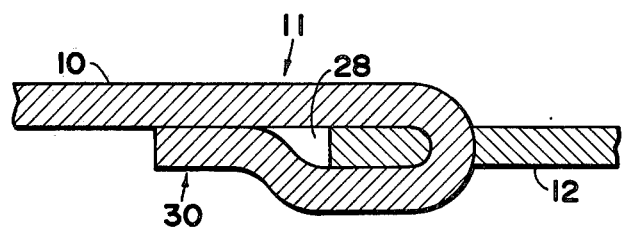

As shown in FIGS. 5 through 7, various methods could be utilized to join the steel plate 10 to the vibration absorbing member 12 at the joint 11. As shown in FIG. 5, ends of the steel plate 10 and the vibration absorbing member 12 are superimposed on each other and joined together with a rivet 24. As shown in FIG. 6, the end of the vibration absorbing member 12 is clamped between the end of the steel plate 10 and a band-like steel plate 25 and opposing portions 26 of the steel plates 10 and 25 are spot welded together. As shown in FIG. 7, an end of the steel plate is folded back and an end of the vibration absorbing member 12 is inserted into this "U" shaped appurture 28 and the folded back portion 30 of the steel plate 10 is spot welded to the steel plate 10.

It should be apparent that there exists in the art other methods of coupling the steel plate 10 to the vibration absorbing member 12.

In this embodiment, the portion of the engine adjacent to the first cylinder has a high cooling effect due to the wind caused by the running of the motor vehicle and hence is lightly heated. Accordingly it is at this portion of the engine that the vibration absorbing member of the heat insulating member is provided. Therefore since the temperatures are not too high, the asbestos which forms the vibration absorbing member is not excessively heated and does not deteriorate. Therefore, the vibration absorbing member will have high durability.

Figure 8:
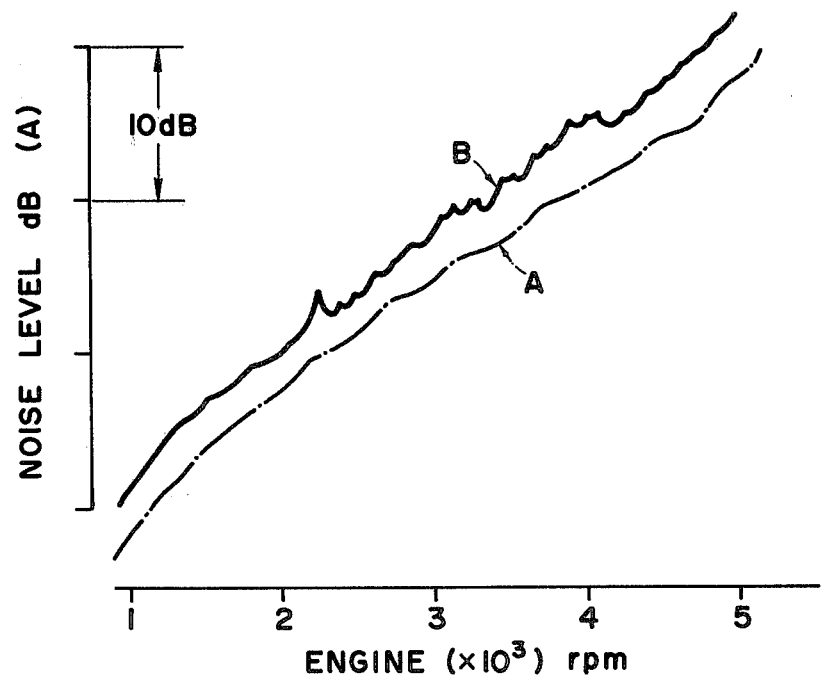
FIG. 8 is a graphical chart illustrating the relationship between the RPM of a motor vehicle engine and the noise level.

To determine the effect of the heat insulating plate with a vibration absorbing member of the present invention on the noise of a motor vehicle engine, experiments were conducted. According to the experiments conducted, in FIG. 8, the dotted chain line indicated by A is the noise level of an engine equipped with a heat insulating plate of the present invention plotted against the RPM of an engine whereas indicated by the solid line B is shown the noise level of an engine equipped with a prior art insulating plate plotted against engine RPM. As shown in the Figure, the noise level of the engine equipped with a heat insulating member according to the teachings of the present invention is less than the noise level of an engine equipped with a prior art insulating member. In fact the noise difference is approximately 3dB at each RPM of the engine.

Additionally, another similar experiment indicates that as compared with heat insulating plates provided only at the central portion thereof with vibration absorbing members, heat insulating plates provided at the ends thereof with vibration absorbing members have high vibration absorbing and insulating effect. It is deemed that synergistic action results from the product of the work of a vibration absorbing member itself multiplied by work thereof results in a mass damper.

In the above embodiment, the vibration absorbing members are disclosed only at the end of the heat insulating plate and around the first cylinder of the engine. However, this embodiment should not limit the position and areas where the vibration absorbing members may be disposed. For example, vibration absorbing members may be disposed around central portions or along the entire circumference of the heat insulating plate.

It is further apparent that the scope of applicability of the present invention is not limited to the above described embodiment as applied to exhaust manifold and the heat insulating plate of the present invention is applicable to heat insulating plates disposed around a hot air intake manifold of a motor vehicle engine or any heat insulating plates disposed around a heat source which may be a motor vehicle engine or some other source of heat.

From the foregoing description, it should be apparent to one skilled in the art that the above-mentioned embodiment is but one of many possible specific embodiments which can represent the applications of the principles of the present invention. Numerous and varied other arrangements can be readily devised by those skilled in the art without departing from the spirit and scope of the invention.

I claim:

1. A heat insulating plate comprising:
   a heat resisting metal plate adapted to be secured to a heat source in slightly spaced apart relation to an outer surface of said heat source at a portion heavily affected by heat from said heat source; and
   a vibration absorbing member substantially comprising asbestos integrally joined to said heat resisting metal plate in abutting relationship and disposed at a portion of said heat source which is lightly affected by heat from said heat source whereby vibrational noise from said heat insulating plate is reduced while providing heat insulation from said heat source.

2. A heat insulating plate as set forth in claim 1 wherein said vibration absorbing member is constructed such that asbestos-coated metallic wires are knitted with one another into the form of cloth.

3. A heat insulating plate as set forth in claim 2 wherein said metal plate is a steel plate.

4. A heat insulating plate as set forth in claim 3 wherein ends of said vibration absorbing member and said steel plate are superposed on each other and integrally jointed to each other with a rivet.

5. A heat insulating plate as set forth in claim 3 wherein an end of said vibration absorbing member is clampedly held between an end of said steel plate and a band-like steel plate and opposing portions of the steel plates are spot-welded, whereby said vibration absorbing member and said steel plate are integrally jointed to each other.

6. A heat insulating plate as set forth in claim 3 wherein an end of said steel plate is folded back in the shape of a letter "U", an end of said vibration absorbing member is inserted into the letter "U" shaped aperture, and the folded-back portion of said steel plate is spot-welded to said steel plate, whereby said vibration absorbing member and said steel plate are integrally jointed to eath other.

7. A heat insulating plate according to claim 2 wherein said heat source is a motor vehicle engine.

8. A heat insulating plate according to claim 7 wherein said heat insulating plate is secured to an exhaust manifold of said engine.

9. A heat insulating plate as set forth in claim 1 wherein said vibration absorbing member is one consisting of a wire net made of a heat resisting metal whose meshes have inserted thereinto asbestos.

10. A heat insulating plate as set forth in claim 9 wherein said metal plate is a steel plate.

11. A heat insulating plate as set forth in claim 10 wherein ends of said vibration absorbing member and said steel plate are superposed on each other and integrally jointed to each other with a rivet.

12. A heat insulating plate as set forth in claim 10 wherein an end of said vibration absorbing member is clampedly held between an end of said steel palte and a bandlike steel plate and opposing portions of the steel plates are spot-welded, whereby said vibration absorbing member and said steel plate are integrally jointed to eath other.

13. A heat insulating plate as set forth in claim 10 wherein an end of said steel plate is folded back in the shape of a letter "U", an end of said vibration absorbing member is inserted into the letter "U" shaped aperture, and the folded-back portion of said steel plate is spot-welded to said steel plate, whereby said vibration absorbing member and said steel plate are integrally jointed to each other.

14. A heat insulating plate according to claim 9 wherein said heat source is a motor vehicle engine.

15. A heat insulating plate according to claim 15 wherein said heat insulating plate is secured to an exhaust manifold of said engine.

16. A heat insulating plate as set forth in claim 1 wherein said vibration absorbing member is formed by single substance of asbestos.

17. A heat insulating plate as set forth in claim 16 wherein said metal plate is a steel plate.

18. A heat insulating plate as set forth in claim 17 wherein ends of said vibration absorbing member and said steel plate are superposed on eath other and integrally jointed to each other with a rivet.

19. A heat insulating plate as set forth in claim 17 wherein an end of said vibration absorbing member is clampedly held between an end of said steel plate and a bandlike steel plate and opposing portions of the steel plates are spot-welded, whereby said vibration absorbing member and said steel plate are integrally jointed to each other.

20. A heat insulating plate as set forth in claim 17 wherein an end of said steel plate is folded back in the shape of a letter "U", an end of said vibration absorbing member is inserted into the letter "U" shaped aperture, and the foled back portion of said steel plate is spot-welded to said steel plate, whereby said vibration absorbing member and said steel plate are integrally jointed to each other.

21. A heat insulating plate according to claim 16 wherein said heat source is a motor vehicle engine.

22. A heat insulating plate as set forth in claim 21 wherein said heat inslating plate is secured to an exhaust manifold of said engine.

* * * * *